United States Patent [19]

Stambaugh et al.

[11] 4,321,236

[45] Mar. 23, 1982

[54] PROCESS FOR BENEFICIATING TITANIFEROUS MATERIALS

[75] Inventors: Edgel P. Stambaugh, Worthington; David W. Neuendorf, Lancaster, both of Ohio

[73] Assignee: Kerr-McGee Chemical Corporation, Oklahoma City, Okla.

[21] Appl. No.: 232,057

[22] Filed: Feb. 5, 1981

[51] Int. Cl.³ .............................................. C01G 23/02
[52] U.S. Cl. ....................................... 423/82; 423/86; 75/1 T
[58] Field of Search ....................... 423/82, 86; 75/1 T

[56] References Cited

U.S. PATENT DOCUMENTS

| | | | |
|---|---|---|---|
| 1,889,027 | 11/1932 | Washburn | 423/82 |
| 1,977,208 | 10/1934 | Saklatwalla | 423/82 |
| 3,193,376 | 7/1965 | Lo | 423/86 |
| 3,660,078 | 5/1972 | Yamada et al. | 423/86 |
| 4,019,898 | 4/1977 | Chen et al. | 423/82 |

OTHER PUBLICATIONS

Barksdale, "Titanium", The Ronald Press Co., N.Y., 1966, pp. 237–238.

*Primary Examiner*—Herbert T. Carter
*Attorney, Agent, or Firm*—William G. Addison

[57] ABSTRACT

An improved process for beneficiating titaniferous material whereby formation of fines during leaching of the titaniferous material is minimized. The titaniferous material and mineral acid reactants each are heated to an elevated temperature prior to admixing in the leaching operation. The heated reactants then are admixed in a leaching zone and further heated to a leaching temperature of from about 110° C. to about 150° C. The preheating causes at least a portion of the acid-soluble titanium values in the titaniferous material to be hydrolyzed upon dissolution and to form an acid-insoluble precipitate. At least a portion of the precipitate is caused to deposit upon the titaniferous material such that fines or slime formation in the leach liquor is minimized. The leaching is continued for a sufficient time to dissolve most of the acid-soluble impurities contained in the titaniferous material. The solid residue remaining in the leaching zone is recovered as the beneficiated product.

4 Claims, No Drawings

PROCESS FOR BENEFICIATING TITANIFEROUS MATERIALS

BACKGROUND OF THE INVENTION

1. Field of the Invention

The present invention relates to an improved process for beneficiating titaniferous materials whereby formation of fine particles during leaching of the titaniferous material is minimized.

2. Description of the Prior Art

Iron-containing titaniferous materials, such as ilmenite and leucoxene, and other titanium minerals and compositions are used in the production of titanium dioxide. These materials are used in the production of both pigmentary titanium dioxide and titanium dioxide manufactured for conversion into titanium metal. The titaniferous materials can be treated by the so-called "sulfate process" or by the "chloride process" which employs fluidized bed chlorination followed by vapor phase oxidation to form titanium dioxide. To conserve chlorine during the chlorination process, the titaniferous material preferably is beneficiated to enrich the titanium values and remove undesirable contaminants such as the iron.

Various methods such as magnetic separation and acidic leaching have been used to separate contaminants from the titaniferous material. In general, these methods are difficult to carry out, are uneconomical or produce undesirable by-products which are difficult to remove from the equipment or present disposal problems.

In the process of beneficiating a titaniferous material such as ilmenite by leaching with a mineral acid, the objective is to remove as much of the iron value and other impurities as possible while leaving the titanium values with a particle size most suited for processing into a pigment or titanium metal.

In reality, depending upon the titaniferous material, mineral acid and process conditions employed, a substantial portion of the titanium values are dissolved by the mineral acid. Then, under the influence of temperature and mineral acid concentration, as well as other factors, the dissolved titanium values hydrolyze to form titanium oxides that precipitate from the acidic solution. Some of the precipitated titanium oxide hydrates comprise "fines" or a "slime" of very small particle sizes. The fines are very difficult to separate and economically recover from the acidic solution. Further, if hydrochloric acid is used as the mineral acid and the fines are not removed from the acidic solution, the fines contaminate the iron oxide by-product produced during regeneration of the hydrochloric acid for recycle in the leaching process. The contaminating fines make the iron oxide undesirable for some uses, such as steel manufacture. Thus, fines formation is a direct loss of titanium value from the titaniferous material as well as an operational nuisance.

Various methods have been disclosed to minimize fines formation during acidic leaching of titaniferous materials. U.S. Pat. No. 3,193,376 discloses a two stage leaching process. In the first stage, the titaniferous material is contacted with a mixed acid solution of second stage leach liquor and sufficient fresh hydrochloric acid of at least 20° Be. strength to provide about 60 percent of the stoichiometric amount of acid required to dissolve the impurities in the material. Patentees disclose that this solution preferentially dissolves the acid-soluble impurities while minimizing dissolution of titaniferous values in the first stage apparatus. The leached residue of the first stage then is leached in a second stage operation by contact with fresh hydrochloric acid of at least 20° Bé. strength. The fresh acid is present in an amount sufficient to provide about a 50 percent excess over the stoichiometric amount of acid required to dissolve the remaining acid-soluble impurities. The leached residue then is separated from the second stage leach liquor and recovered as a product. At least a portion of the second stage leach liquor is used as a part of the first stage leaching solution. The temperature of the first and second stage leach liquors is maintained above about 105° C. during the major portion of the leaching operations.

U.S. Pat. No. 3,660,078 discloses a process for leaching a titaniferous material with a mineral acid in the presence of a seed material capable of accelerating the hydrolysis of dissolved titanium values. The seed material can comprise hydrated metal oxides of metals such as titanium, tin, niobium, tantalum, silicon and the like. The seed material generally is employed in a colloidal state. The leaching process is performed in a conventional manner with the exception that a seed material is present in the leaching system. The molar percentage of metal oxide in the seed material generally is an amount of from 0.1 to 10 percent as compared with the titanium dioxide in the titaniferous material. The titanium value that is dissolved is believed to precipitate upon the surface of the original feed material.

U.S. Pat. No. 4,019,898 discloses a process for beneficiating ilmenite by hydrochloric acid leaching in the presence of added sulfate ion. The sulfate ion is present in the leach liquor in an amount of from about 0.5 to 2.5 percent by weight of the ilmenite ore that is to be leached. The presence of the sulfate ion has been found to minimize fines formation and improve the color of the beneficiated ilmenite product.

While the prior art methods have provided some reduction in the quantity of fines produced during acid leaching of titaniferous materials, it still is desirable to provide improved methods that further reduce the quantity of fines that are produced.

SUMMARY OF THE INVENTION

The present invention provides an improved method for beneficiating titaniferous material which can minimize the formation of fines or slime.

The formation of fines or slime occurs during acid leaching of the titaniferous material. Typically, a quantity of a mineral acid, such as hydrochloric acid, is admixed with a quantity of titaniferous material, such as ilmenite, in a vessel in which the reaction to dissolve the iron value and other impurities is to take place. The mixture then is heated to a temperature in the range of from 100° C. to about 150° C. while the mixture is stirred or agitated. This method of leaching encourages fines or slime formation.

In accordance with the process of the present invention, the mineral acid and titaniferous material each are preheated to an elevated temperature prior to admixing. The preheated acid and titaniferous material then are admixed and heated further, if necessary, to a leaching temperature in the range of from about 120° C. to about 150° C. The heated admixture then is stirred or agitated for a period of time sufficient to permit dissolution of a substantial portion of the iron value and other impurities present.

The preheating of the ore and acid permits controlled precipitation of the titanium value dissolved by the acid during the leaching operation upon the titaniferous material particles while the impurities remain dissolved in the acid. The titanium value is precipitated by hydrolysis as titanium dioxide. The leached titaniferous material having the titanium dioxide precipitate thereon, then is recovered as a product.

DESCRIPTION OF THE PREFERRED EMBODIMENT

The present invention provides an improved process for beneficiating titaniferous materials, whereby formation of fines or slime during acid leaching of the titaniferous material is minimized. The term "titaniferous material" as used herein means titaniferous iron ores, such as ilmenite, leucoxene, and the like and any other titanium minerals and compositions that are at least partially soluble in a mineral acid and materials prepared by subjecting such titaniferous ores to chemical or physical processing.

The titaniferous material, depending upon the ferric iron and ferrous iron content, may be subjected to a reduction process prior to acidic leaching. The reduction can be achieved by roasting the material in a furnace or rotary kiln by conventional techniques, that is, the titaniferous material can be mixed with a solid such as coal or coke or a liquid such as fuel oil, or a gas such as hydrogen or carbon monoxide and heated to temperatures in the range of from about 800° C. to about 1100° C. to convert most of the ferric iron to ferrous iron.

The degree of reduction can be partial, that is, just to reduce most of the ferric iron to ferrous iron or substantially complete, that is, most of the iron value being reduced to metallic iron. For certain titaniferous materials, for example unweathered ilmenite which contains mainly ferrous iron, the reduction can be omitted. In some processes a preoxidation roasting to convert most of the iron value to the ferric state can be employed prior to the reduction.

In conventional mineral acid leaching processes, the titaniferous material, generally at ambient temperature, is admixed with a mineral acid which can be at a moderate temperature, generally below 95° C., to form a slurry. The slurry then is heated to a leaching temperature level in the range of from about 100° C. to about 140° C. by steam or other means. The large quantity of acid present combined with the relatively low initial temperature of the slurry causes solubilization of a portion of the titanium value in the titaniferous material. As the temperature of the slurry begins to rise to the preferred leaching temperature level and the acid concentration is reduced through consumption of acid by the leaching reaction, the solubilized titanium value is hydrolyzed and precipitates as fines. Any additional titanium value which is dissolved during the elevated temperature portion of the leaching process preferentially will precipitate upon the fines as a result of the large total surface area of the fines in comparison to the particles of titaniferous material. This solubilization and precipitation of the titanium value of the titaniferous material as fines significantly reduces the titanium value of the beneficiated titaniferous material. In contrast, the present invention significantly reduces the loss of titanium values as fines or slime by causing the solubilized titanium value to preferentially precipitate upon the surface of the titaniferous material particles.

In accordance with the process of the present invention the titaniferous material, whether treated or untreated, is heated to an elevated temperature and admixed with a preheated mineral acid. The heating of the titaniferous material can be accomplished by steam injection or any other method known by individuals skilled in the art. Preferably, the titaniferous material is heated to a temperature in excess of about 100° C. and most preferably in excess of about 120° C.

The mineral acid can comprise, for example, hydrochloric acid, sulfuric acid or the like. The quantity of the acid admixed with the titaniferous material is an amount sufficient to dissolve most of the iron value and other impurities present in the titaniferous material. More particularly, sufficient acid is present to provide an excess of from about 10 to 30 percent of the stoichiometric requirement necessary to dissolve the impurities. When the mineral acid comprises hydrochloric acid, the concentration of the acid commonly is from about 17 to 20 percent hydrochloric acid. Such hydrochloric acid advantageously is produced by treatment of the leach liquor resulting from the beneficiation process. More particularly, the leach liquor which is formed, comprising mainly water, iron chlorides and some free hydrochloric acid is "spray-roasted" in the presence of air whereby the iron chlorides are converted into hydrochloric acid and iron oxide. The regenerated hydrochloric acid then is absorbed in water to form an acidic solution having a 17 to 20 percent hydrochloric acid concentration.

The mineral acid is preheated to an elevated temperature prior to admixing with the preheated titaniferous material. The heating can be accomplished by any suitable means known by individuals skilled in the art. One method of heating the acid is by passage through a heat exchanger. Preferably, the mineral acid is heated to a temperature in excess of 95° C. and most preferably in excess of 100° C.

The admixture of preheated titaniferous material and preheated mineral acid then is subjected to further heating, if necessary, to raise the temperature of the mixture to a level in the range of from about 120° C. to about 150° C. for the leaching operation. This temperature level is maintained for a sufficient period of time to permit a substantial portion of the iron value and other impurities contained in the titaniferous material to be dissolved. Preferably, the mixture is stirred or agitated during the leaching operation. Typically, the leaching period is from about 4 to 16 hours.

While the mechanism of the process presently is unknown, it is believed that the relatively high temperature conditions of the titaniferous material and mineral acid upon admixing cause the titanium value that is solubilized by the acid to rapidly hydrolyse and precipitate. The reaction occurs at such a rate that the solubilized titanium value does not have an opportunity to diffuse from the vicinity of the titaniferous material particle into the bulk material acid solution. Thus, the hydrolyzed titanium value is caused to precipitate upon the surface of the titaniferous material particle. Absent the initial hydrolysis and precipitation of fines produced when conventional leaching procedures are employed, there is no high surface area fine crystal bed to promote the precipitation of any subsequently solubilized titanium value in the bulk mineral acid solution. This significantly reduces the quantity of fines or slime that is produced during the leaching process.

The leaching may be accomplished in one or more stages, in either a batch or continuous manner, and at atmospheric pressure or above. Preferably, the leaching operation is performed at a pressure of from about 20 to 50 psig. When the desired degree of leaching is achieved, the leach liquor is separated from the solid residue by conventional means. The separated leach liquor can be introduced into an acid regeneration system for the regeneration of the mineral acid. The solid residue having the precipitated titanium dioxide thereon is washed with water to separate any remaining leach liquor from the solids. The wet solid residue then can be calcined at a temperature in the range of from about 700° C. to about 1200° C. to remove both free and combined water. The solid residue is recovered as a product having a titanium dioxide content in excess of 90 to 95 weight percent, depending upon the composition of the original titaniferous material.

To further illustrate the process of the present invention, and not by way of limitation, the following example is provided.

EXAMPLE

To illustrate the effect preheating of the reactants has upon the formation of fines in the beneficiation of a titaniferous material, several leaches were performed with reduced, weathered ilmenite. The conditions in each leaching operation were the same with the exception of the preheating temperature of the reactants. The leaching was effected in two stages. The mineral acid employed was 17 percent hydrochloric acid. The ratio of ore to acidic solution in each leaching stage was 0.7 gram/milliliter. The leaching temperature maintained in each stage was 140° C. Slow stirring was employed in each leaching stage and operation of each stage was continued until the acid concentration leveled off indicating substantial acid consumption. The preheating temperature conditions and the percentage of titanium oxide lost as fines from the total titanium dioxide content of the ilmenite during the leaching process is set forth in the following Table:

TABLE

| Test No. | Temperature, °C. | | Percentage of TiO$_2$ Lost as Fines | | |
|---|---|---|---|---|---|
| | Acid | Ilmenite | Stage 1 | Stage 2 | Total |
| 1[1] | 95 | 30 | 0.95 | 2.57 | 3.52 |
| 2 | 95 | 100 | 0.27 | 0.45 | 0.72 |
| 3 | 105 | 105 | 0.12 | 0.22 | 0.34 |
| 4 | 105 | 140 | 0.18 | 0.07 | 0.25 |

[1]Control using conventional conditions

The results clearly illustrate the benefit that practice of the process of the present invention provides in reducing fines or slime formation during mineral acid leaching of a titaniferous material. The quantity of fines produced during mineral acid leaching employing conventional procedures can be reduced from about 70 to over 90 percent by practice of the process of the present invention.

While the present invention has been described with respect to what at present is considered to be the preferred embodiment thereof, it is to be understood that changes or modifications can be made in the process described without departing from the spirit or scope of the invention as defined by the following claims.

What is claimed is:

1. A titaniferous material beneficiation process comprising:
   heating an aqueous hydrochloric acid to a temperature above about 95° C.;
   heating a particulate titaniferous material containing acid-soluble contaminant values including iron to a temperature above about 100° C.;
   contacting said heated particulate with said heated acid to dissolve at least a portion of said contaminant values to provide a leach liquor containing acid-soluble contaminant values and a beneficiated particulate comprising titanium values which are substantially insoluble in said heated acid;
   hydrolyzing at least a portion of any dissolved titanium values in said leach liquor;
   precipitating a substantial portion of said hydrolyzed titanium values upon the surface of at least a portion of said beneficiated particulate whereby diffusion of said dissolved titanium values into the bulk solution of said leach liquor substantially is prevented and the formation of fines comprising precipitated titanium values in the bulk solution of said leach liquor is reduced; and
   recovering said beneficiated particulate together with any precipitate of titanium values thereon.

2. The process of claim 1 wherein the titaniferous material is heated to a temperature in excess of about 120° C.

3. The process of claim 1 wherein the mineral acid is heated to a temperature in excess of about 100° C.

4. The process of claim 1 wherein the titaniferous material is ilmenite.

* * * * *